United States Patent [19]
Glew et al.

[11] Patent Number: 5,721,857
[45] Date of Patent: Feb. 24, 1998

[54] METHOD AND APPARATUS FOR SAVING THE EFFECTIVE ADDRESS OF FLOATING POINT MEMORY OPERATIONS IN AN OUT-OF-ORDER MICROPROCESSOR

[75] Inventors: Andrew F. Glew, Hillsboro; Jeffrey M. Abramson, Aloha; Kris G. Konigsfeld; Atiq Bajwa, both of Portland, all of Oreg.; Warren R. Morrow, Vancouver, Wash.; William C. Alexander, III, Portland, Oreg.

[73] Assignee: Intel Corporation, Santa Clara, Calif.

[21] Appl. No.: 651,506

[22] Filed: May 22, 1996

Related U.S. Application Data

[63] Continuation of Ser. No. 175,932, Dec. 30, 1993, abandoned.

[51] Int. Cl.$^6$ .............................. G06F 9/26; G06F 12/00; G06F 12/10
[52] U.S. Cl. ...................... 395/401; 395/421.1; 395/181; 395/182.13; 395/182.18; 395/800
[58] Field of Search .................................. 395/401, 800, 395/570, 394, 392, 383, 587, 591, 181, 182.13, 182.18, 421.1

[56] References Cited

U.S. PATENT DOCUMENTS

| | | | |
|---|---|---|---|
| 4,797,816 | 1/1989 | Uchiyama et al. | 395/421 |
| 5,136,697 | 8/1992 | Johnson | 395/586 |
| 5,155,817 | 10/1992 | Kishigami et al. | 395/394 |

(List continued on next page.)

OTHER PUBLICATIONS

Tse Yu Yeh and Yale N. Patt, *Two–Level Adaptive Branch Prediction*, the 24th ACM/IEEE International Symposium and Workshop on MicroArchitecture, Nov. 1991.

Tse Yu Yeh and Yale N. Patt, *Alternative Implementations of Two–Level Adaptive Branch Prediction*, Proceedings of the Nineteenth International Symposium on Computer Architecture, May 1992.

(List continued on next page.)

*Primary Examiner*—Jack A. Lane
*Assistant Examiner*—Than V. Nguyen
*Attorney, Agent, or Firm*—Blakely, Sokoloff, Taylor & Zafman

[57] ABSTRACT

A method is provided for recovering the effective address of memory instructions in an out-of-order microprocessor for use by an exception handler upon the occurrence of one of an exception and a systems management interrupt. The microprocessor comprises at least one execution unit for executing a plurality of instructions out-of-order and a re-order buffer having storage locations for buffering result data produced from the execution of the plurality of instructions. Each instruction is associated with a location designator to identify a unique storage location within the re-order buffer in which the result data for an executed instruction is written. The microprocessor further comprises a memory order buffer having storage locations for buffering memory instructions waiting for access to memory for execution, these storage locations also being identified by corresponding location designators. According to this embodiment of the microprocessor, the effective address of memory instructions can be reconstructed by utilizing the location designators of the ROB (Reorder Buffer) to find the corresponding storage location in the MOB (Memory Order Buffer) at which place the linear address for the instruction may be found. By associating both the retirement and exception information of the memory instructions stored within the storage locations of the re-order buffer with the corresponding memory instructions and information stored within the memory order buffer, the linear address of either the youngest, valid, retiring memory uop or the oldest, valid, excepted memory uop can be selected, written to memory and subsequently used to reconstruct the effective address of the memory instruction for use by an exception handler.

19 Claims, 8 Drawing Sheets

U.S. PATENT DOCUMENTS

| | | | |
|---|---|---|---|
| 5,226,126 | 7/1993 | McFarland et al. | 395/374 |
| 5,257,214 | 10/1993 | Mason et al. | 364/736.5 |
| 5,341,482 | 8/1994 | Cutler et al. | 395/591 |
| 5,355,457 | 10/1994 | Shebawow et al. | 395/394 |
| 5,394,529 | 2/1995 | Brown, III et al. | 395/587 |
| 5,398,330 | 3/1995 | Johnson | 395/182.13 |
| 5,404,467 | 4/1995 | Saba et al. | 395/383 |
| 5,404,557 | 4/1995 | Yamashita | 395/800 |
| 5,420,990 | 5/1995 | McKeen et al. | 395/392 |
| 5,421,020 | 5/1995 | Levitan | 395/800 |
| 5,421,022 | 5/1995 | McKeen et al. | 395/800 |
| 5,517,651 | 5/1996 | Huck et al. | 395/570 |
| 5,517,657 | 5/1996 | Rodgers et al. | 395/800 |
| 5,557,763 | 9/1996 | Senter et al. | 395/800 |
| 5,590,297 | 12/1996 | Huck et al. | 395/401 |

OTHER PUBLICATIONS

"Superscalar Microprocessor Design" by Mike Johnson, Advanced Micro Devices, Prentice Hall, 1991.

Popescu et al. "The Metaflow Architecture" IEEE Micro Jun. 1991, pp.10–13 and 63–73.

Intel Microprocessor and Peripheral Handbook, Intel Corp, 1989 pp. 4–12 and 4–13.

METHOD AND APPARATUS FOR SAVING THE EFFECTIVE ADDRESS OF FLOATING POINT MEMORY OPERATIONS IN AN OUT-OF-ORDER MICROPROCESSOR

This is a continuation of application Ser. No. 08/175,932, filed Dec. 30, 1993, now abandoned.

BACKGROUND OF THE INVENTION

1. Field of the Invention

The present invention relates to the field of data processing using out-of-order microprocessor architectures, and more particularly, to methods and apparatus for saving the floating point environment state and effective address of floating point memory operations for later use by the microcode, especially upon the occurrence of a floating point exception.

2. Description of Related Art

A) Floating Point Operations In An Intel Micro-Processor Architecture

In the implementation of an Intel microprocessor architecture, a floating point execution unit (or "FPU") comprises eight individually addressable 80-bit numeric registers organized as a register stack; three 16-bit registers containing a FPU status word, a FPU control word, and a tag word; and error pointers consisting of two 16-bit registers containing selectors for the last instruction and operand, two 32-bit registers containing offsets for the last instruction and operand, and one 11-bit register containing the opcode of the last non-control FPU instruction.

In the FPU register set shown in FIG. 1(a), each of the eight numeric registers R0–R7 is 80 bits wide and is divided into fields corresponding to the processor's extended real data type. Numeric instructions address the numeric registers relative to the register on the top of the stack. At any point in time, this top-of-stack register or "TOP register" is indicated by the TOP field or "TOP pointer" (not shown) in the FPU status word. Load or push operations decrement the TOP pointer by one and load a value into the newly indicated TOP register. A store-and-pop operation stores the value from the current TOP register and then increments the TOP pointer by one. Like stacks in memory, this FPU register stack grows down toward lower-addressed registers.

The 16-bit status register shown in FIG. 1(b) reflects the overall state of the FPU. The four FPU condition code bits ($C_3$–$C_0$) are similar to flags in a CPU; the processor updates these bits to reflect the outcome of arithmetic operations. These condition code bits are used principally for conditional branching. Bits 11–13 of the status word form the TOP pointer which points to the FPU register that is the current TOP register. FIG. 1(b) further shows the six exception flags in bits 0–5 of the status word. Bit 7 is the exception summary status (ES) bit which is set if any unmasked exception bits are set, and is cleared otherwise. Bits 0–5 indicate whether the FPU has detected one of six possible exception conditions since these status bits were last cleared or reset. Bit 6 is the stack fault (SF) bit which distinguishes invalid operations due to stack overflow or underflow from other kinds of invalid operations.

The FPU provides the programmer with several processing options, which are selected by loading a word from memory into the control register shown in FIG. 1(c). The low-order byte of this control register configures the numerical exception masking. Bits 0–5 of the control register contain individual masks for each of the six floating-point exception conditions recognized by the processor. The high-order byte of the control word configures the FPU processing options, including precision control and rounding control. The precision-control bits (bits 8–9) can be used to set the FPU internal operating precision at less than the default precision (64-bit significand). Furthermore, these control bits can be used to provide compatibility with the earlier-generation arithmetic processors having less precision than the Intel 32-bit FPU's. The rounding-control bits (bits 10–11) provide for the common round-to-nearest mode, as well as directed rounding and true chop.

The tag word (TW) indicates the contents of each register in the register stack. The TW is used by the FPU itself to distinguish between empty and nonempty register locations. Programmers of macro-code exception handlers may use this tag information to check the status of contents of a numeric register without performing complex decoding of the actual data in the register. The tag values from the TW correspond to physical registers 0–7. Programmers must use the current TOP pointer stored in the FPU status word to associate these tag values with the relative stack registers ST(0) through ST(7).

The numeric instruction and data pointers (or "error pointers") provide support for macro-code exception handlers. Whenever the processor decodes an ESCAPE-type instruction, it saves the instruction's address opcode and the operand address (if present) in registers that can be accessed by the user. The contents of these registers remain unchanged when any of the FP control instructions are executed. The contents of the operand address register are undefined if the prior ESCAPE instruction (which is not a control instruction) did not have a memory operand.

B) Floating Point Exceptions And Software Exception Handlers

In the execution of FP operations by the FPU, the outcome of an operation may be an erroneous or unexpected result, otherwise known as a numeric exception, which must be corrected, minimized or at least accounted for. Examples of the classes of numeric exceptions normally recognized by a FPU 1) Division by zero;
2) Denormal operands;
3) Numeric overflow and under flow;
4) Invalid operations including certain arithmetic operations and stack operations (i.e., stack overflow and underflow);
5) Indefinite (representing a masked invalid operation); and
6) Not-A-Number (NAN), including signaling NANs and quiet NANs.

When numeric exceptions occur, the processor takes one of two possible courses of action: The FPU can itself handle the exception, producing the most reasonable result and allowing numeric program execution to continue undisturbed. Alternatively, a macro-code exception handler can be invoked to handle the exception.

Each of the six classes of numeric exceptions listed above has a corresponding flag bit in the FPU status word and a mask bit in the FPU control word. If an exception is masked (mask bit=1), the processor takes an appropriate default action and continues with the computation. If the exception is unmasked, a macro-code exception handler is invoked immediately before execution of the next WAIT or non-control FP instruction. Depending on the value of the numeric exception or "NE" bit of the CR0 control register, the exception handler is invoked either through interrupt vector 16 (an operating system call that invokes the exception handler when NE=0) or through an external interrupt (when NE=0). The exception handling routine is normally a part of the system or application software where typical exception responses include: Incrementing an exception counter for later display or printing; printing or displaying diagnostic information; aborting further execution; and using the numeric instruction pointers to build an instruction that will run without exception and executing it.

In order to permit the exception handler to perform its task of obtaining the correct result for a FP memory (or address) -type operation that is in error, the handler must be able to extract the FPU environment state upon the occurrence of a numeric exception and save it to memory. The exception handler must also be able to extract the FPU environment state for FP memory-type operations when a system management interrupt occurs so that any potential FP exceptions (which may have caused the interrupt) can be corrected. This is accomplished by means of the exception handler instructing the microprocessor to execute a FP store environment instruction ("FSTENV") which writes the current FPU environment to a specified memory location. This instruction also masks any subsequent FP exceptions while the current exception is being handled in order to prevent an infinite loop from occurring by means of subsequent exceptions causing an immediate return to the exception handler. The FPU environment data that is written to memory consists of the FPU control word, status word, tag word and error pointers (both instruction and data).

With respect to FP memory operations which utilize memory operands (such as FP loads and FP stores), it is imperative that the effective address of the memory operand be made available for the exception handler upon the occurrence of an exception or a system management interrupt. This is necessary so that the exception handler can determine the precise nature of the exception encountered and so that the data stored at the effective address of the memory operand can be retrieved and repaired. In previous Intel microprocessor architectures, this is accomplished by simply tracking the effective address of the memory operands for all FP operations currently stored in the FPU and writing the effective address to a specified register or memory location when needed by the exception handler.

C) Speculative, Out-Of-Order Microprocessor Architectures

Early microprocessors generally processed instructions one at a time. Each instruction was processed using four sequential stages: instruction fetch, instruction decode, execute, and result writeback. Within such microprocessors, different dedicated logic blocks performed the different processing stages. Each logic block had to wait until all previous logic blocks had completed their operations before it could begin its own operation.

To improve microprocessor efficiency, microprocessor designers overlapped the operations of the fetch, decode, execute, and writeback stages such that the microprocessor operated on several instructions simultaneously. In operation, the fetch, decode, execute, and writeback stages concurrently process different instructions. In each clock cycle the results of each processing stage are passed to the following processing stage. Microprocessors that use the technique of overlapping the fetch, decode, execute, and writeback stages are known as "pipelined" microprocessors. In order for these pipelined microprocessors to operate efficiently, an instruction fetch unit (IFU) at the head of the pipeline must continually provide the pipeline with a stream of instructions. Yet, conditional branch instructions within an instruction stream prevent the IFU from fetching the correct instructions until the condition is resolved, thereby preventing the IFU from fetching the proper instructions since such conditions cannot not be resolved until further down the pipeline.

To alleviate this problem, several studies have been undertaken with pipelined microprocessors that use branch prediction mechanisms to predict the outcome of branches and fetch subsequent instructions according to the branch prediction. Branch prediction is achieved using a branch target buffer (BTB) to store the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units (EUs) results in a substantial increase in instruction throughput. With out-of-order completion and/or speculative execution, any number of instructions are allowed to be in execution in the EUs up to the total number of pipeline stages in all the functional units. Instructions may complete out of order because instruction dispatch is not stalled when a functional unit takes more than one cycle to compute a result. Consequently, a functional unit may complete an instruction after subsequent instructions have already completed.

In a processor using out-of-order completion, instruction dispatch is stalled when there is a conflict for a functional unit or when an issued instruction depends on a result that is not yet computed. However, the stall occurs only for those instructions which need uncomputed result or have a conflict. In order to prevent or mitigate stalls in decoding, a processor may have a buffer known as a reservation station (RS) between the decode and execute stages. The processor decodes instructions and places them into the RS as long as there is room in the buffer, and at the same time, examines the instructions in the RS to find those that can be dispatched to the EUs (that is, instructions for which source operands and EUs are available). Hence, instructions are dispatched from the RS to a functional unit with little regard for their original program order. However, the capability to issue instructions out-of-order introduces a constraint on register usage.

In an out-of-order processor, out-of-order execution occurs for a subsequent instruction when a previous instruction requires more clock cycles for its execution than the previous one. However, this out-of-order execution may cause the subsequent instruction, which is executed first, to overwrite a value in a register that a previous instruction needs for its execution. This type of dependency is called a storage conflict (or an "anti-dependency"), because the reuse of storage locations (including registers) causes instructions to interfere with one another even though the conflicting instructions are otherwise independent. Such storage conflicts constrain instruction dispatch and reduce performance.

Storage conflicts can be removed by providing additional surrogate registers that are used to reestablish the correspondence between registers and values, a process known as "register renaming". These surrogate or "physical" registers are associated with the original logical registers and values needed by the program using register renaming. To implement register renaming, the processor may allocate a new physical register for every new value produced, i.e., for every instruction that writes to a register. An instruction identifying the original logical register for the purpose of reading its value obtains instead the value in the corresponding physical register. Thus, the hardware renames the logical register identifier in the instruction to identify the physical register that contains the correct value. The same register identifier in several different instructions may actually access different physical registers depending on the location of the register references with respect to the register assignments.

To support register renaming, the result value of a decoded instruction is assigned to a physical register in a functional unit called a reorder buffer (ROB). The operation's original destination register is associated with this physical register. When a subsequent instruction refers to the original destination register to obtain the value it believes is stored in the register, this subsequent instruction obtains instead the value stored in the ROB register if that value has been computed.

The logical registers specified by the decoded instruction are assigned to the ROB registers by a unit called the allocator (ALLOC). A register alias table (RAT) is coupled to the allocator and keeps track of such assignments. The use of register renaming in the ROB not only avoids register resource dependencies to permit out-of-order execution, but also plays a key role in speculative execution. If the instruction sequence given above is considered to be part of a predicted branch, then one can see that execution of those instructions using the ROB registers has no effect on the logical registers denoted by an instruction. Thus, if it is determined that the branch was mispredicted, the results calculated and stored in the ROB may be erased and the pipeline flushed without affecting the logical registers found in the processor's real register file (RRF). If the predicted branch affected the values in the RRF, then it would be impossible to recover from branch misprediction because the values stored in the logical registers before the predicted branch was taken could not be determined without the use of redundant registers in the ROB.

As instructions are executed out-of-order, a given logical register may be written many times. Thus, different instructions may cause the same register identifier to be written into different ROB registers through renaming since the instructions specify the same logical register. To obtain the correct value when this happens, the ROB prioritizes multiple matching entries by order of allocation and returns the most recent entry for use by subsequent instructions. When a result is produced, it is written to the ROB and to any entry of the RS representing the logical register. When the value is written into the RS, it may provide an input operand to one or more waiting instructions buffered in the RS, freeing the instructions to be dispatched to one or more EUs. After the value is written into the ROB, subsequent instructions continue to fetch the value from the ROB unless the entry is superseded by a new ROB register assignment and until the value is retired by writing it to the RRF.

Retirement occurs in the order of the original instruction sequence after execution of the instructions. After the processor determines that the predicted instruction flow is correct, the processor commits the speculative results of those instructions that were stored in the ROB to an architectural state by writing those results to the RRF. The RAT then updates its record keeping to indicate the reassignment of the values to the RRF.

With respect to memory operations in a conventional out-of-order processor, memory instructions are decoded into loads and stores and then buffered either in separate load and store reservation stations or in a central memory reservation station (MRS) where they await execution. In terms of execution ordering, stores are executed in order with respect to both stores and loads to prevent speculative caching and premature overwriting of a value that may be needed by a previous load. Loads, on the other hand, are executed out of order with respect to stores, although not with respect to other loads. Therefore, loads are given priority over stores for memory accesses to the data cache unit (DCU) since loads can be executed any time after all previous loads are completed and because they are more likely to produce a value that the processor needs to proceed with computation.

When a store dispatched from the MRS has an ordering conflict with a load, the store is temporarily held in a store buffer (SB) until the conflict is resolved. The SB aids in executing stores according to the original program order and in deferring the completion of a store until all earlier instructions (including loads) have completed so as to prevent speculative caching.

When a load is dispatched and it bypasses previous stores, the load may need to obtain data from a store that has not yet been executed. The processor checks for a true dependency between the load and any previous stores by comparing the original memory address of the load against the original memory addresses of all previous, uncompleted stores. A load has a true dependency on a store if the load address matches the address of a previous store, or if the address of any previous store is not yet computed. If a load is found to be dependent on a store, the load cannot be satisfied by the data cache because the data cache does not have the correct value. In such a case, if the valid address of a store matches the address of a subsequent load, the load can be satisfied directly from the SB rather than waiting for the store to complete (a condition known as "store forwarding").

If a load address matches an address in the SB and store forwarding is implemented, the load data is supplied, if available, directly from the SB. The dependency logic must identify the most recent matching SB entry since the address of more than one SB entry may match the load address, and the most recent entry contains the required data (or a tag for the data). To reduce the effect of logic delays involved in dependency checking and forwarding, these operations can be performed as a load is issued to the DCU, with the load being canceled as required if a dependency is detected. However, this canceling may require support in the DCU and must be implemented in such a way that it prevents the load from affecting the system state before it can be canceled.

For a more detailed explanation on conventional, out-of-order microprocessor architectures, please refer to M. Johnson, *Superscalar Microprocessor Design*, Prentice Hall (1991).

SUMMARY OF THE INVENTION

In order to enable a macro-code exception handler to correct a FP numeric exception in an out-of-order microprocessor architecture, it would appear necessary to provide each entry of the ROB with an additional 32 bit register (or field) specifically for the purpose of recovering the effective address of a FP memory operation upon the occurrence of an exception. The same would also be required for temporarily buffering the effective address of all floating point operations for potential use by an exception handler if a system management interrupt were to occur after execution of the operation, but before it was retired. However, it would be desirable to avoid the implementation of additional registers within each ROB entry in order to minimize the size and circuit complexity of the microprocessor.

It is therefore an object of the present invention to provide a method and apparatus in an out-of-order microprocessor for recovering the effective address of a FP operation and supplying it to micro-code for use by an exception handler upon the occurrence of a exception or systems management interrupt.

It is another object of the present invention to provide a method and apparatus in an out-of-order microprocessor having a re-order buffer and a memory order buffer for writing the linear address of a memory operation stored in the memory order buffer to a specified control register in memory for use in reconstructing the effective address upon signaling by the re-order buffer either that a systems management interrupt has occurred during retirement of the operation or that the retiring operation has caused an exception in its execution.

It is yet another object of the present invention to provide a method and apparatus in an out-of-order microprocessor for latching the linear address of an at-retirement store operation upon redispatch of the operation to an address generation unit and subsequently to memory before it is deallocated in the memory order buffer so that it may be used to reconstruct the operation's effective address upon occurrence of an exception or a systems management interrupt.

These and other objectives of the present invention are accomplished in an out-of-order microprocessor having, among other things, a reservation station (RS) for buffering decoded micro-instructions (referred to as "uops") until they are sent to an execution unit (EU) for execution, a re-order buffer (ROB) for buffering the results of the executed uops until they are committed to architectural machine state in original program order and a memory order buffer (MOB) utilized for buffering memory uops until they are committed to architectural memory state through corresponding memory accesses. Upon allocation of uops, the original source and destination registers specified by the uops are allocated corresponding entry locations or physical registers within the ROB by an allocator. These physical registers of the ROB are uniquely identified by location designators ("Pdsts") which are specified in each entry of the ROB, MOB and RS.

According to the embodiment of the microprocessor described above, the effective address of an excepted memory uop is recovered by utilizing the Pdst index of the ROB to find the corresponding Pdst entry in the MOB at which place the linear address for the uop may be found. Since the MOB acts a second order reservation station for potentially blocking speculative memory uops and redispatching them to memory at another time, the linear address of each memory uop is written into the MOB by the address generation unit (AGU) upon dispatch of the memory uop from the RS. Therefore, by associating both the retirement and fault information for the Pdst entries of the ROB with the corresponding entries of the MOB, the linear address of the youngest, valid, retiring uop or the oldest, valid, excepted retiring uop can be written to memory during each clock cycle. The linear address is then used along with the FP data segment of the retiring uop to reconstruct its effective address when needed by and exception handler in the case of an exception or a systems management interrupt.

More specifically, this is performed by first associatively matching the location designators of N preselected uops of the ROB with the location designator of each uop buffered in the MOB to produce a first set of N match bits for each uop of the MOB, with each of the N match bits of a uop of the MOB corresponding to a preselected uop of the ROB and being set upon a match between location designators, the N preselected uops of the ROB comprising uops for which valid result data has been computed by the execution unit.

The first set of N match bits of each uop of the MOB are then qualified with the valid bit of each uop of the MOB, respectively, to produce a second set of N match bits for each uop of the MOB, with a match bit of the second set of N match bits for a uop of the MOB being set when both the valid bit and one of the match bits of the first set of N match bits of the same uop are set. Each of the N match bits of the second set of match bits are then qualified with either retirement bits or guarantee bits of the N preselected uops of the ROB, respectively, to produce a third set of N match bits for each uop of the MOB, with a match bit of the third set of N match bits for a uop of the MOB being set when both the corresponding retirement bit (or guarantee bit) and corresponding match bit of the second set of N match bits of a uop are set.

Subsequently, each of the N match bits of the third set of match results are qualified with N save floating point linear address (SVFLA) bits of the N preselected uops of the ROB, respectively, to produce a fourth set of N match bits, with a match bit of the fourth set of N match bits for a uop of the MOB being set when both the corresponding SVFLA bit and corresponding match bit of the third set of N match bits of a uop are set. Finally, the floating point linear address of a uop buffered within the MOB is written to a control register accessible by the exception handler when one of the match bits of the fourth set of N match bits of the corresponding uop is set.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus in an out-of-order microprocessor for recovering the effective address of floating point memory-type micro-operations for use in the case of an exception or a system management interrupt. In the following description for purposes of explanation, specific memories, organizations, architectures, data rates, etc. are set forth in order to provide a thorough understanding of the present invention. However, it will be apparent to one skilled in the art that the present invention may be practiced without these specific details. In other instances, well known circuits are shown in block diagram form so as not to unnecessarily obscure the description of the present invention.

A) Overview Of The Out-Of-Order Microprocessor

Figure 1A:
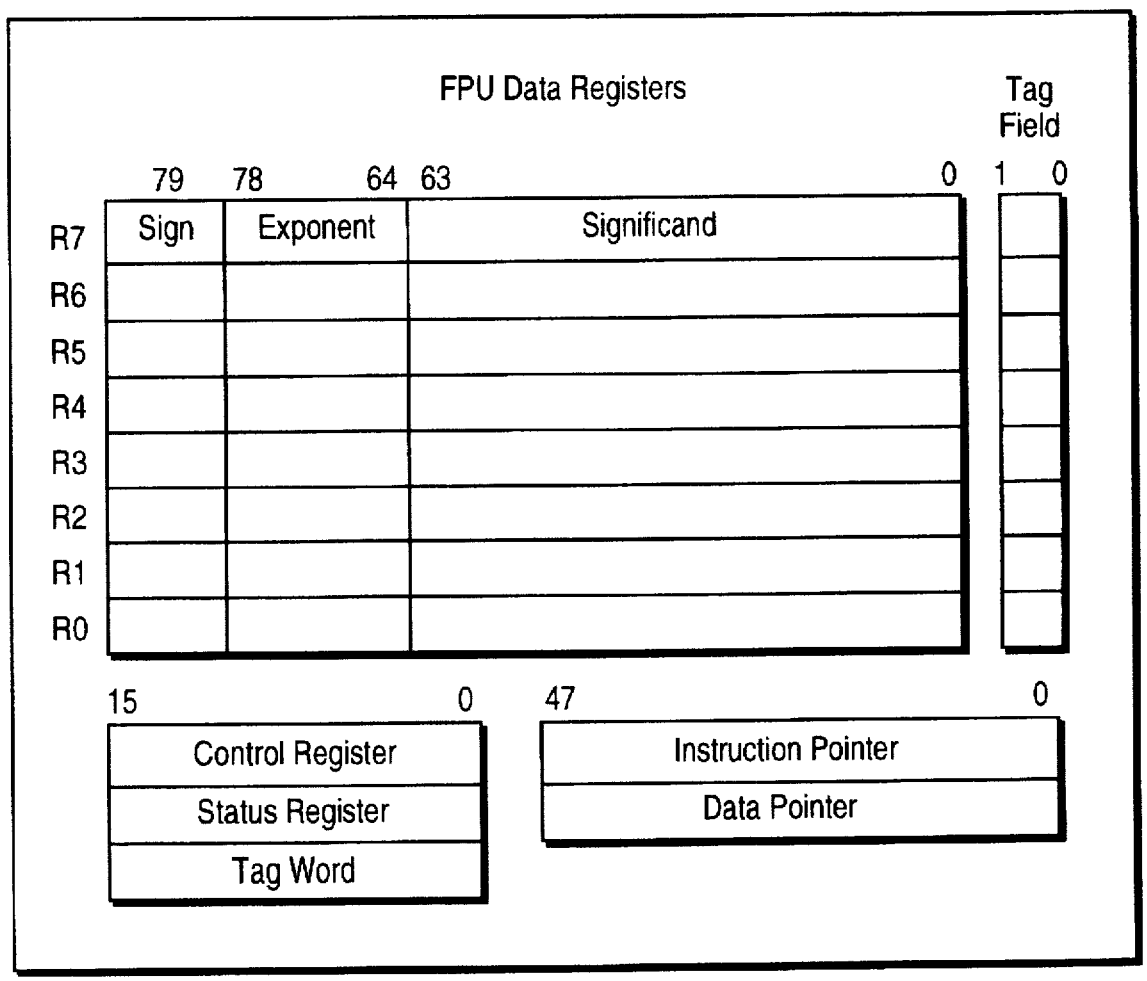
FIG. 1(a) is a diagram of a conventional FPU register set used in an Intel microprocessor architecture.
Figure 1B:
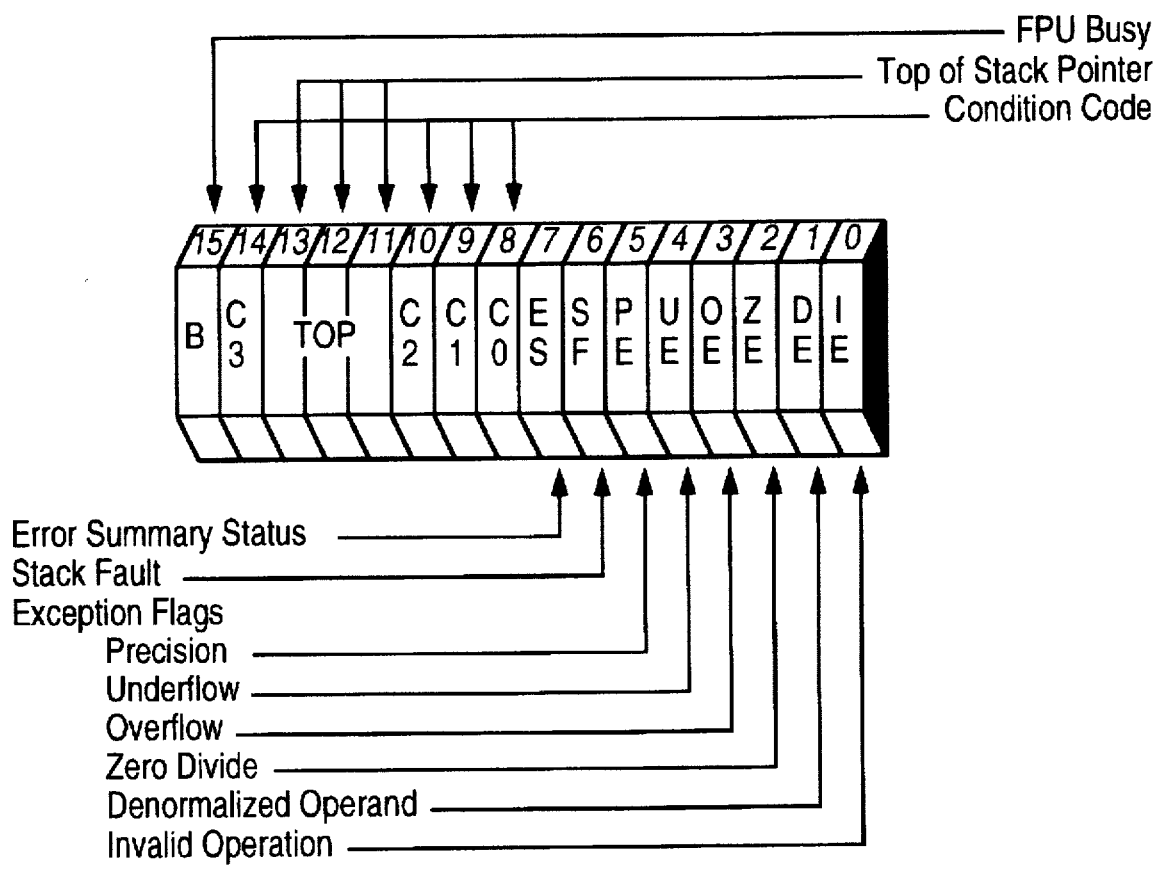
FIG. 1(b) is a detailed diagram of the FPU status register shown in FIG. 1(a).
Figure 1C:
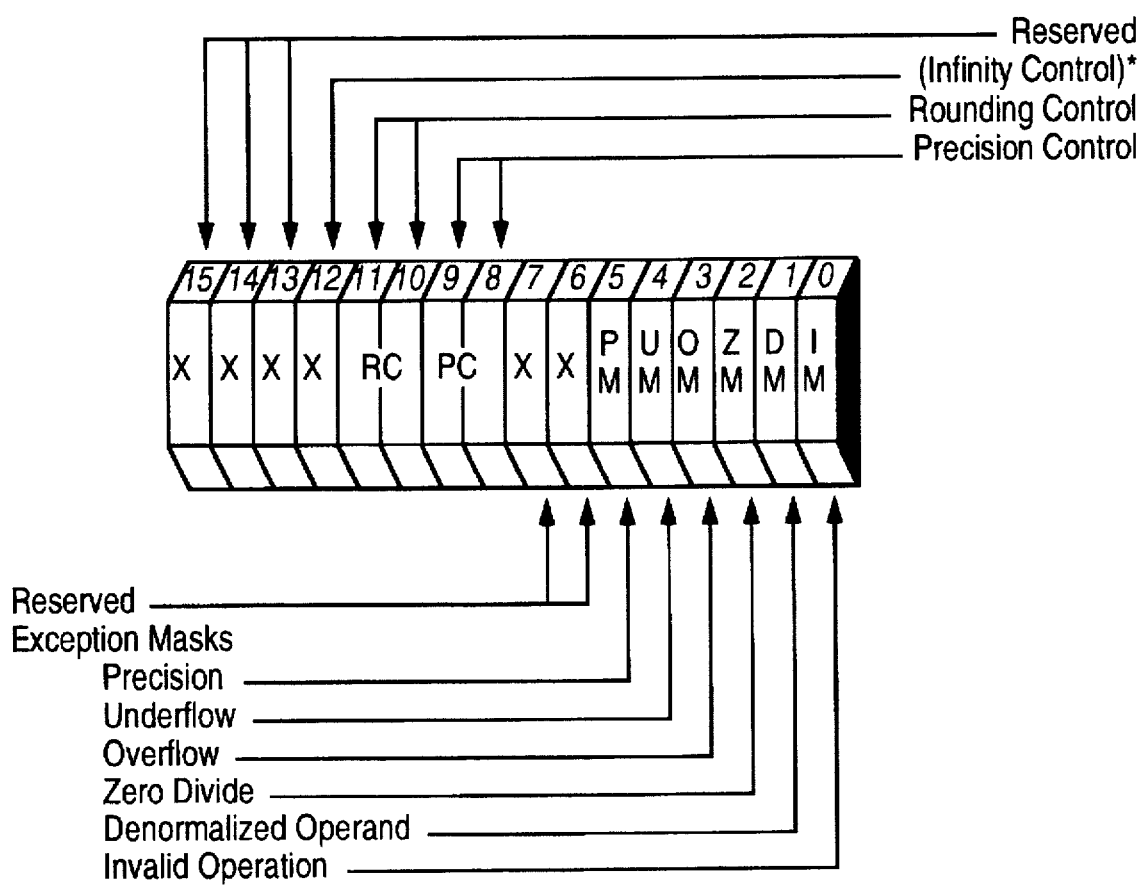
FIG. 1(c) is a detailed diagram of the FPU control register shown in FIG. 1(a).
Figure 2:
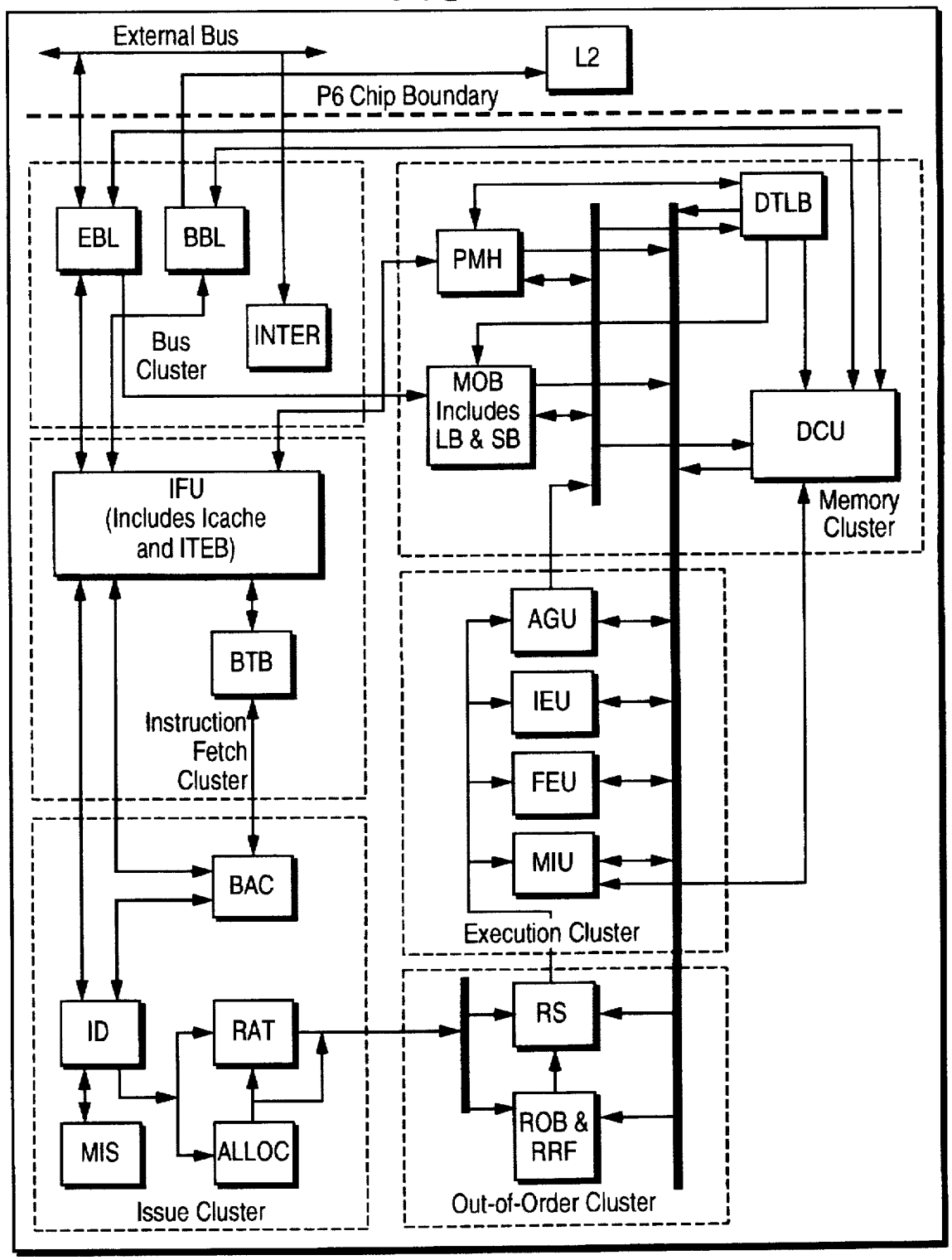
FIG. 2 is a block diagram of a speculative, out-of-order microprocessor architecture preferably utilized in the present invention.

FIG. 2 is a block diagram of one embodiment of an out-of-order processor in which the present invention may be utilized. The processor comprises an instruction fetch unit (IFU) coupled to a branch target buffer (BTB) and an instruction decoder (ID). The IFU fetches instructions based upon the predicted instruction pointer provided by the BTB. Those instructions are decoded by the ID into micro-instructions or micro-operations ("uops"). The original source and destination registers specified by the uops are allocated corresponding entry locations or physical registers within a reorder buffer (ROB) and a real register file (RRF) by an allocator (ALLOC). A register alias table (RAT) keeps track of the correspondence between the logical destination registers of the instructions and their corresponding physical registers within the ROB and the RRF.

The ROB supports speculative execution by buffering the results of the execution units (EUs) before committing them to an architecturally visible state. This allows the processor to fetch and execute instructions at a maximum rate by assuming that branches have been properly predicted and that no faults have occurred in execution. If these assumptions are found to be incorrect, the processor can recover by discarding the speculative results stored in the ROB. The processor can also restart at the proper instruction by examining the committed architectural state in the ROB. The process of committing speculative state to architectural state is known as "retirement" of executed instructions.

Figure 3:
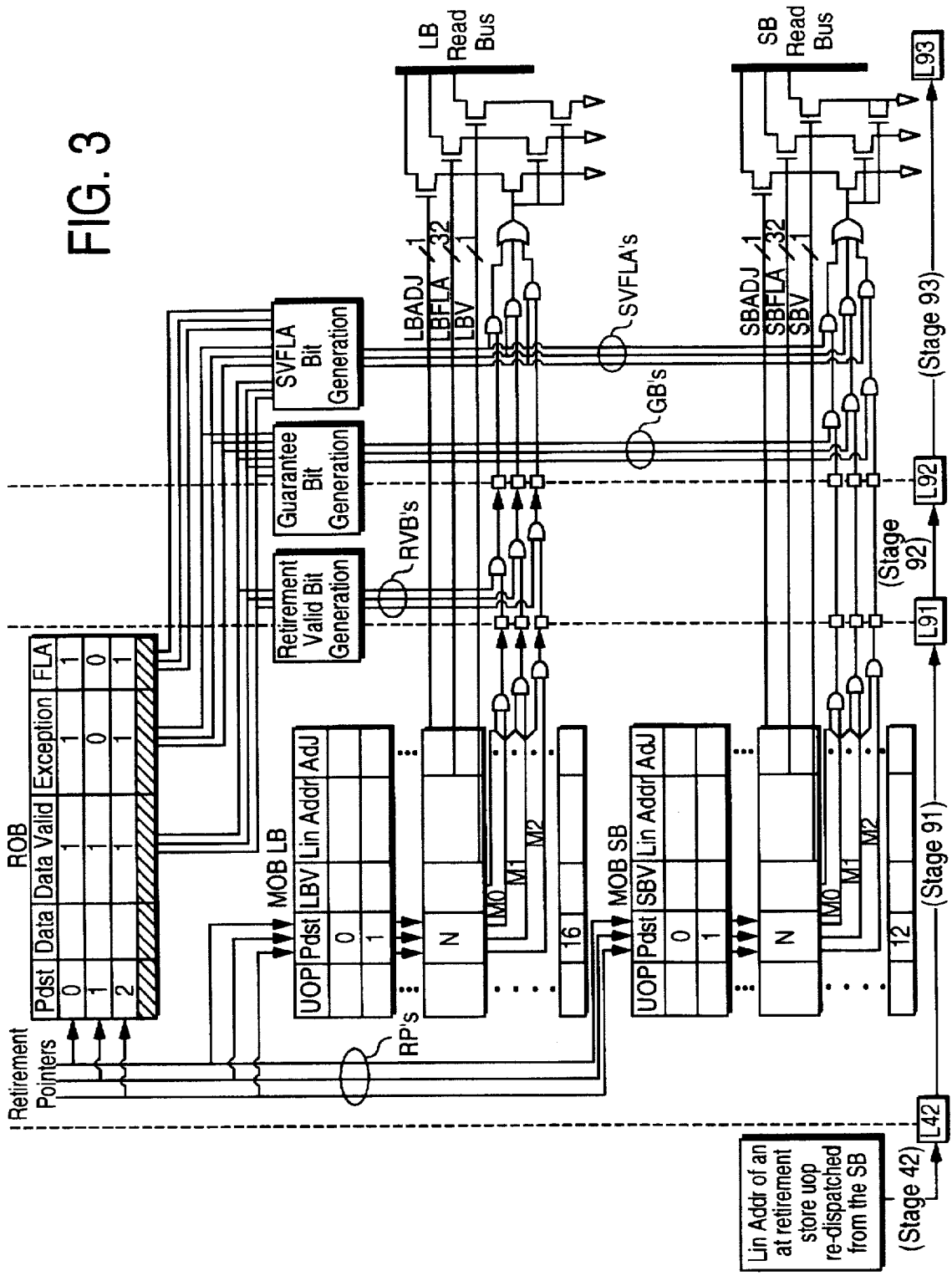
FIG. 3 is a block diagram of the ROB, MOB LB and MOB SB showing exemplary circuitry used in the present invention.

The ROB supports register renaming by allocating a new physical register (identified in the functional units by the symbol "Pdst") as the destination of every uop which writes to a logical register. (In this embodiment, every uop is assigned a Pdst entry in the ROB (as shown in FIG. 3) by the ALLOC even if no useful result is written into that physical register.) The renaming process is hardware managed and is invisible to the macro-code and micro-code. Upon retirement, the retirement logic in the ROB updates the logical registers based upon the contents of each renamed instance of the physical registers.

Referring again to FIG. 2, the ROB further supports out-of-order execution by allowing the EUs to complete execution of the uops out-of-order without regard to other uops which are executing simultaneously. After decoding, the uops are first placed in a reservation station (RS) and are allocated Pdst entries in the ROB by the allocator. The uops in the reservation station wait for the resources needed for their execution, including source operands and an appropriate EU. Once the resources are ready, one or more uops are "dispatched" to the EUs for execution and result data for each executed uop is written back into respective Pdst entries of the ROB. The RS watches over the execution of the uops and retrieves source operands for uops waiting in the RS for dispatch either from the writeback bus upon completion or subsequently from the fields of the ROB itself. Upon indication from the RS, the ROB retirement logic reorders the completed uops into the original sequence issued by the ID as it updates the architectural state.

The out-of-order nature of the writebacks force the EUs to report any exceptions to the ROB in the form of an exception code written in an exception field of the ROB. Instead of correcting an unmasked exception during execution, the ROB examines the exception information field for a particular uop at retirement before making the decision to commit the uop's result to architectural state. If an unmasked exception is detected, all speculative uops subsequent to the excepted uop (in terms of their Pdsts) are cleared from the ROB and a micro-code or macro-code exception handler is invoked to correct the exception.

In addition to those interfaces shown in FIG. 2, the ROB also has important interfaces to a MicroInstruction Sequencer (MIS) and a memory order buffer (MOB). Its interface with the MIS allows the ROB to signal an exception to the MIS, forcing the MIS to jump to a particular exception handler micro-code routine. Additionally, the ROB's interface with the MOB, which is the functional unit that interfaces the out-of-order portion of the microprocessor to the memory system, allows the MOB to commit architectural memory state for a particular uop when that uop is being committed to architectural machine state by the ROB.

B) Operation of the ROB and RS in the Out-Of-Order Microprocessor

Figure 6:
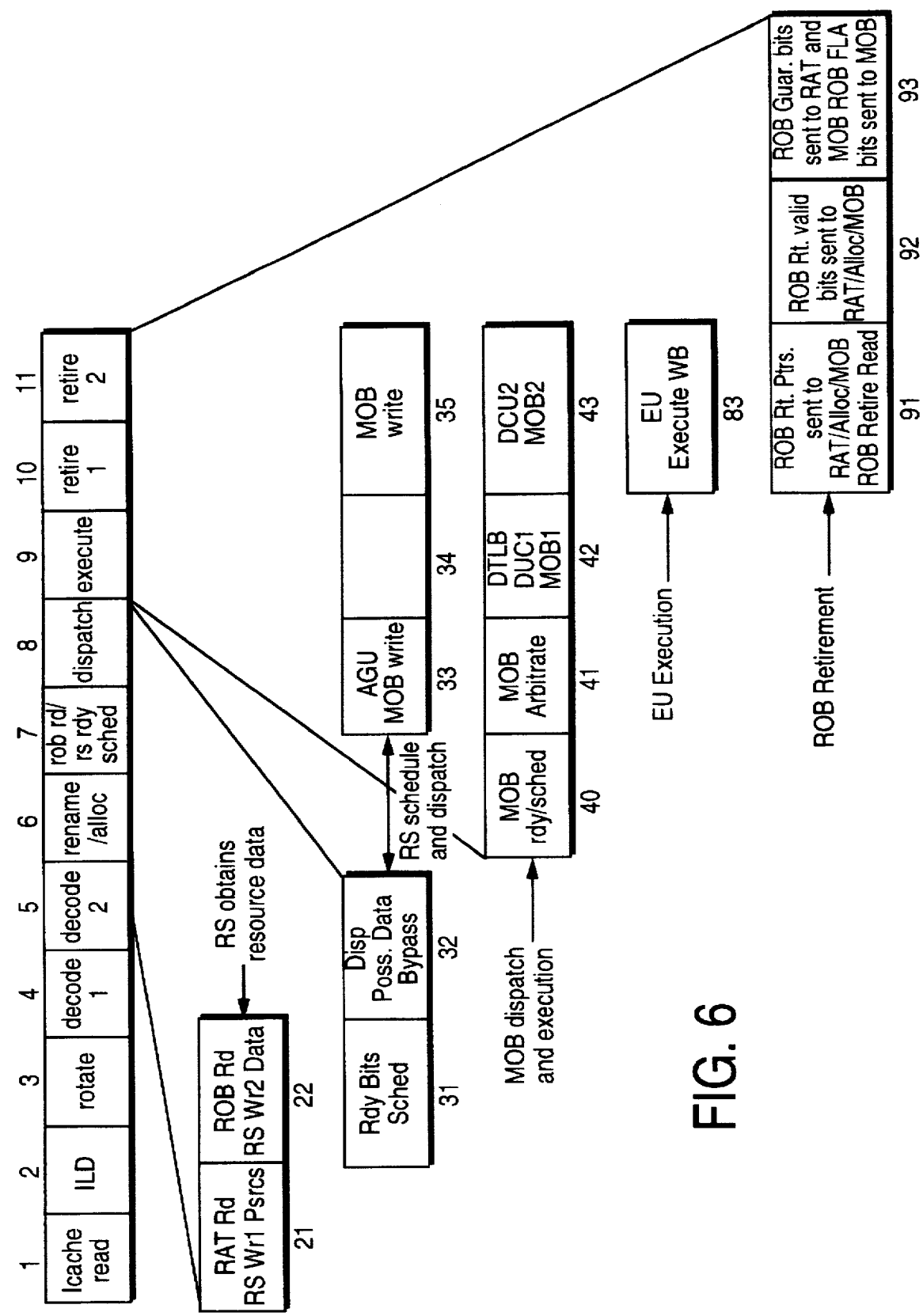
FIG. 6 is a block diagram of the pipeline stages traversed by the out-of-order microprocessor shown in FIG. 2.

FIG. 6 diagramatically depicts the flow of microprocessor operations through the pipeline stages of the various functional units. In pipe stages 4 and 5, based upon the instruction pointer (IP) sent from the BTB to the IFU, the IFU fetches the macro-instruction found at the address indicated by the IP, and the instruction is decoded into one or more uops by the ID. According to the preferred embodiment of the present invention, the ID transfers the stream of uops to the RAT and ALLOC, issuing up to three in-order uops during each clock cycle of the processor. In pipe stage 21, the ALLOC renames the logical source and destination registers of a received uop to correspond to physical source and destination registers of the ROB allocated at this time (i.e., the Pdst entries). This mapping of original destination registers to Pdst entries of the ROB is maintained in the RAT. The ALLOC further determines which memory-type uops are floating point, memory uops (i.e., FP loads and FP stores) and indicates this to the ROB by setting a FLA tag bit in a FLA field of the ROB.

Additionally, in pipe stage 21, the ALLOC also assigns each incoming uop an entry in the RS. If the resources are available, the RS is able to schedule up to five uops for dispatch to the EUs where they will be simultaneously executed. The ALLOC writes the uop into the RS along with its Pdst (from the ROB) and the addresses of its required source operands (Psrc). Although the RS in this embodiment comprises a single RS (as shown in FIG. 2), it is possible to implement the RS as two separate RS's comprising an integer RS and a floating point RS.

Before a uop is dispatched from the RS to an EU, the RS must determine whether or not the source data needed for its execution is available from its own data field or from that of either the ROB or the RRF. Therefore, in pipe stage 22, source data is read from both the ROB and the RRF to determine whether the needed source data for that uop is available and valid. If available, the source data is written into the appropriate RS data field of the waiting uop and the RS generates a corresponding ready bit (pipestage 31) which indicates that the uop's source data is available and that the uop may soon be dispatched. If, however, the source data is not available in either of the RS, RRF or ROB, then the RS must monitor the result/writeback busses from the EU interfaces and read the needed source data therefrom when the result data is being written back to the ROB.

In pipe stage 31, the RS dynamically schedules the ready uops for dispatch, and in pipe stage 32, dispatches the scheduled uops to their respective EUs for execution. Once a uop has been dispatched, and no cancellation occurs due to a cache or memory miss, the entry in the RS can then be deallocated for use by a new uop. After execution of the uop in pipe stage 83, the result data produced is either written back into the ROB or bypassed to other EUs waiting on that data for execution of another scheduled uop.

Retirement is a key function undertaken in the ROB wherein the out-of-order execution of uops by the EUs is re-ordered into an in-order completion of uops. A uop is to be retired when all uops prior to it have been executed and retired such that it is no longer considered to be speculative (assuming no exceptions have occurred in the execution of that uop). During each clock cycle, the ROB is able to retire up to three uops that have been executed and are no longer in a speculative state. The ROB retirement logic commits uop result data to architectural state in pipestages 92 and 93. To indicate which of the entries of the ROB are the oldest, and hence, the most likely to be retired next, three register-based retirement pointers RP's (shown in FIG. 3) are provided for storing the Pdsts of the three oldest ROB entries.

In the initial stage of retirement (pipestage 91), the retirement pointers RP's are transmitted to each of the RAT, ALLOC and MOB to inform these units which uops are up for retirement. The Pdsts entries are then read out onto the data bus so that the data for the entries can be written into the RRF. Since the retirement pointers RP's only identify the three oldest ROB entries without indicating their completion or the validity of their result data, it is necessary to further qualify the selected entries for retirement to indicate which of the retiring Pdst entries in the ROB have valid result data and are no longer speculative in their own execution. This is done by means of the EU's generating corresponding data valid bits DVB's (upon execution of each uop) that are subsequently written into a data valid field of the ROB (shown in FIG. 3). However, a uop having its data valid bit DVB set may still be speculative in that the execution of a previous uop has not yet been completed. Therefore, it is further necessary to generate retirement valid bits RVB's for each of the three, retiring entries which will only be set for the oldest, consecutive entries that are no longer speculative. Hence, as shown in Table I below, the retirement valid bits RVB's for the three Pdst entries selected for retirement will form only four combinations out of the possible eight data valid bit DVB combinations indicating in-order retirement of none (0,0,0), some (1,1,0 or 1,0,0) or all (1,1,1) of the selected entries:

TABLE I

| Pdst | C1 | C2 | C3 | C4 | C5 | C6 | C7 | C8 |
|------|----|----|----|----|----|----|----|----|
| DATA VALID BIT COMBINATIONS ||||||||||
| 0 | 1 | 1 | 1 | 0 | 0 | 0 | 0 | 1 |
| 1 | 1 | 1 | 0 | 0 | 0 | 1 | 1 | 0 |
| 2 | 1 | 0 | 0 | 0 | 1 | 1 | 0 | 1 |
| ⇓ |||||||||
| RETIREMENT VALID BIT GENERATION ||||||||||
| 0 | 1 | 1 | 1 | 0 | 0 | 0 | 0 | 1 |
| 1 | 1 | 1 | 0 | 0 | 0 | 0 | 0 | 0 |
| 2 | 1 | 0 | 0 | 0 | 0 | 0 | 0 | 0 |

Subsequently, in pipe stage 92, the retirement valid bits RVB's are transmitted to each of the RAT, ALLOC and MOB to inform them which of the oldest entries should be retiring in the next cycle. With respect to the MOB, the retirement valid bits RVB's received from the ROB are used to determine which of the load uops will definitely be retiring in that cycle.

As a final precursor to retirement, guarantee bits GB's are generated for each of the three oldest Pdst entries of the ROB in a guarantee bit generation unit (shown in FIG. 3) by qualifying the data valid bits DVB's stored in the ROB retirement valid field with the exception code stored in the ROB exception field. The output for each retiring Pdst entry will be a high logical state (i.e. a set guarantee bit GB) when the data valid bit DVB for that entry has been set by the EU, no exception has occurred in execution of the corresponding uop or a previous, retiring uop and no branches have been mispredicted for the same corresponding uop or a previous, retiring uop. The guarantee bits GB's are then transmitted to each of the RAT and MOB in pipe stage 93 to identify which uops will actually retire. This information is needed by the RAT in order that it can update its table, whereas in the MOB, the guarantee bits GB's are used to determine which of its store uops in the SB will definitely be retired at retirement.

In most instances, the guarantee bits GB's should match the retirement valid bits RBV's for each entry. However, if an exception has occurred in execution of a uop, the EU would set the retirement valid bit RVB and either writeback the most correct result data in the data field of the ROB (for a masked exception) or simply report the exception in the form of an exception code in the exception field of the ROB (for an unmasked exception). In the case of an unmasked exception, the guarantee bit generation unit would output a low logic signal (i.e., the guarantee bit not set) for the excepted uop and all subsequent (i.e., younger) uops, and retirement of the excepted uop would be delayed until the exception is corrected by an exception handler. In this case, all subsequent Pdst entries would be cleared from the ROB because they are assumed to contain incorrect data. In the case of a masked exception, the guarantee bit generation unit would output a high logic signal for the excepted uop since the error in its result data has been minimized. If, however, a mispredicted branch did occur, the Pdst entry of the uop which is the subject of the mispredicted branch and all subsequent Pdst entries would simply be cleared because their result data is incorrect and uncorrectable.

C) Operation of the MOB in the Out-Of-Order Microprocessor

With respect to memory operations fetched by the IFU, the ID decodes them into one uop for a load and two uops for a store: a Store Data (STD) and a Store Address (STA). The ALLOC allocates entries for these memory uops in the MOB which contains two main buffers, the load Buffer (LB) and the store address Buffer (SB). Both the LB and SB (individually shown in FIG. 3) are circular queues with each entry of the two buffers representing either a load or a store uop, respectively.

With reference to FIGS. 2 and 6, at allocation time, the memory uops are tagged with their eventual location in the LB or SB. The MOB then receives these speculative load and store operations from the RS. The RS provides the opcodes for the operations, while the AGU calculates and provides the linear addresses needed for the memory accesses. These operations are either executed immediately by the Memory Cluster when their linear addresses and corresponding data are available and valid, or they are written into the MOB for dispatch to memory at a later time.

According to the preferred embodiment of the MOB as shown in FIG. 3, the LB contains 16 buffer entries, holding up to 16 loads, while the SB contains 12 entries, holding up to 12 stores. The LB is used to queue load operations unable to complete when originally dispatched from the RS due to a memory ordering conflict with an earlier store. The queued operations are then redispatched when all conflicts have been removed. The SB is used to queue all store operations before dispatch to memory. Stores are never performed speculatively since a memory write is not reversible. In addition, stores are also never re-ordered among themselves. Therefore, the SB dispatches stores in original program order when the store has both its address and data, and its state is no longer speculative. The SB also checks all loads for store address conflicts. This checking keeps loads consistent with previously executed stores still residing in the SB by means of blocking all loads which are older than an undispatched store.

In the dispatch of a load, the DCU is expected to return the data to the DCU through its interface to the MIU. The MOB writes the linear address of the load in addition to a writeback valid bit (LBV) into the LB to signal the validity of the data written back. In the dispatch of a store, the MOB similarly completes the operation by writing back a valid bit (SBV) into the SB. This indicates that the address portion of the store is valid. The data portion of the store is executed by the MIU Store Data Buffer SDB (not shown). The MIU will signal to the RS, ROB, and SB when the data for the store has been received and written to memory. For senior stores, which are stores that have been retired by the ROB but have not yet been dispatched to memory due to the unavailability of the memory bus, the SB of the MOB will hold on to the address of the store until the ROB indicates that the operation is no longer speculative, and hence, is ready to retire. The MOB then dispatches it to the DCU to commit the senior store to memory system state and deallocates the corresponding entry. However, for at-retirement stores, which are stores that have been blocked from becoming senior (i.e. from retiring) due to a problem in translating their linear addresses the SB will redispatch these stores (first to the DTLB for re-computation of the physical address and then to the DCU) and deallocate their corresponding entries before the operations are retired in the ROB itself.

In general, most operations that execute in the memory cluster are expected to complete three cycles after dispatch from the RS. However, memory operations are not totally predictable as to their translation and availability from the cache. In cases such as these, the operations require other resources that may not be available. Thus, the operations must be deferred until the resource becomes available. Therefore, the MOB LB employs a general mechanism for blocking load memory operation until a later wake-up signal is received. When a wake-up signal is received, all deferred memory operations that match the blocking code and identifier are marked ready for dispatch. In addition, the MOB SB also employs a restricted mechanism for blocking store address memory operations. When a store is blocked so as to become an at-retirement store, it will remain blocked until the ROB retirement pointers RP's indicate that it is the oldest non-retired operation in the machine. The operation will then be dispatched at retirement with a write to the DCU occurring simultaneously with the dispatch of the store address uop.

With respect to retirement of memory uops, the Pdst entries in both the LB and SB are selected for retirement first through matching of the three ROB retirement pointers RP's with each of the Pdst entries of the LB and SB in stage 91 (shown in FIG. 3). The output from this retirement pointer RP match are three match bits M0, M1 and M2 for each of the Pdst entries of the LB and SB, with a match bit M0, M1 or M2 being set if a match has been found. It is noted that although FIG. 3 only shows the retirement pointer RP match for the Nth Pdst entry of the LB and SB, three match bits M0, M1 and M2 would be produced for each Pdst entry of the LB and SB. Also in stage 91, the match bits M0, M1 and M2 (for each LB and SB Pdst entry) are qualified with the load buffer valid bit LBV or the store buffer valid bit SBV for the corresponding Pdst entry. During stages 92 and 93, the results of the last qualification (for each MOB Pdst entry) are further qualified with the ROB retirement valid bits RVB's (for the Pdst's of the LB) and with the generated guarantee bits GB's (for the Pdst's of the SB). Hence, those Pdst entries of the MOB for which a match has occurred, which have a set LBV or SBV and for which either the RVB or the GB, respectively, is set will be deallocated in pipe stage 94.

D) Floating Point Operations In the Out-Of-Order Microprocessor

With regard to floating point operations, FP uops are first written into the RS, and then dispatched to the FEU for execution when the uop's source data is available and valid (assuming the FEU is also available). Referring to the fields of the ROB array shown in FIG. 3, a FLA tag bit is generated for each memory-type FP uop and stored in a FLA field corresponding to that uop's Pdst at time of allocation. Upon execution of the FP operation, the opcode and result data of the speculatively executed uop are written into corresponding fields of the ROB Pdst entry. Additionally, an exception code is generated for each FP uop and written into its corresponding ROB Pdst entry by the FEU.

In the case of an unmasked exception, the ROB will not handle it until the uop causing it comes up for retirement for the reason that the excepted uop may be speculative, and hence, may never even enter the retirement process. However, when an unmasked exception is reported in a writeback to the ROB and the responsible uop is being considered for retirement, the ROB asserts an RONuke signal which resets both the in-order and out-of-order functional units of the processor by clearing all speculative uops in those units issued after the excepted uop. The ROB will then force the MIS to jump to a macro-code exception handler that will repair the result data returned by the excepted uop.

As previously discussed in the background section, upon the occurrence of either an unmasked floating point exception or a systems management interrupt (SMI), the effective address of FP memory-type uops needs to be supplied to the exception handler via execution of the FSTENV instruction so that the precise nature of the exception or SMI can be determined and the data of the FP uop can be accessed. However, since the effective address for speculative uops are not stored within the fields of the ROB array, a mechanism must be provided for 1) reading the linear address of a uop which has caused an unmasked exception or is the subject of an SMI from a corresponding entry of another functional unit in which it is buffered in addition to 2) reading the corresponding floating point data segment from the RRF. Furthermore, another mechanism must also be provided for 3) writing the linear address read from the appropriate functional unit to a control ("FLA") register in memory that is accessible by micro-code. Once this has been done, the effective address of the FP uop can be reconstructed either in the hardware or in micro-code by scaling the data segment and subtracting it from the linear address. In other words, the effective address of the FP uop can be reconstructed either in the hardware or in micro-code by subtracting the segment base address from the linear address.

It is noted that when reference is made to the linear address of a particular FP uop, this includes not only the linear address of the uop, but also an adjust bit (Adj) which when set indicates that the particular uop is a FP signed exponent (SEXP) memory access for which an offset must be subtracted from its linear address to obtain the linear address of the FP uop's significand. For example, in the preferred embodiment of the present invention, FP uops comprise a precision, and hence, a linear address of 80 bits such that a FP load using a 64 bit memory bus requires two memory accesses. If the linear address of the FP uop requested by micro-code is that of a SEXP uop, the Adj bit will be set so as to instruct the micro-code to subtract the offset (32 bits) from the SEXP linear address in order to obtain the linear address of the uop's significand. Accordingly, for systems which utilize FP operations having a higher precision so as to thereby require more than two memory accesses, additional adjust bits would have to be implemented in order to indicate the number of offsets that must be subtracted from the SEXP linear address.

According to the embodiment of the microprocessor described above, the effective address of a FP uop can be recovered by utilizing the Pdst index of the ROB to find the corresponding Pdst entry in either the LB or SB of the MOB at which place the linear address may be found. Due to the fact that the MOB acts a second order reservation station for potentially blocking speculative memory uops and redispatching them to memory at another time, the linear address of each memory uop is written into the MOB by the AGU upon dispatch of the memory uop from the RS. Hence, by associating both the retirement information and the FLA tag bits for the retiring Pdst entries of the ROB with each Pdst entry of the MOB, the linear address for each memory uop currently retiring can be recovered and written to memory for potential use by the exception handler. In the preferred embodiment, however, FP loads and stores are stored in separate buffers, thereby requiring that both buffers be simultaneously searched for the linear address which is then read out onto separate busses.

In retirement of the three oldest ROB Pdst entries, the ROB first transmits to each of the LB and SB of the MOB its three retirement pointers RP's to identify which of the corresponding entries of the MOB are up for retirement. As shown in FIG. 3, the Pdst's of the ROB entries identified by these pointers are associatively matched with the Pdst entries in both the LB and SB by means of a content addressable match (CAM) enabled by storing the Pdst of each entry in the MOB as a tag in a content addressable memory. Matching logic outputs three match results M0, M1 and M2 for each entry of the LB and SB, with the match results M0, M1 and M2 comprising binary values (or other logic signals) representing either that a match was found (a binary one or high logic state) or that no match was found (a binary zero or low logic state) between the ROB retirement pointers RP's and the Pdst's of the MOB entries. These match results M0, M1 and M2 are then qualified against the valid bits (LBV or SBV) of the same Pdst entries of the MOB so as to output a high logic state for those entries of the MOB having a matching Pdst index in addition to a computed addresses. In the embodiment of the present invention shown in FIG. 3, such qualifications are performed through combinational logic elements (i.e., AND or OR gates), although other, well-known logic means such as comparators, CAMs or the like may also be utilized to produce similar results.

Subsequently, in pipestages 92 and 93, the ROB retirement valid bits RVB's and the generated guarantee bits GB's of the ROB Pdst entries selected for retirement are then sent to each entry of the LB and SB of the MOB, respectively, to further qualify the match results M0, M1 and M2 of each MOB entry output from the first qualification. The output of this second qualification forms a high logic state when the uop of a matching MOB entry has a computed address in the MOB and valid, non-speculative data in the ROB such that the uop is ready to retire.

It is at this point that the ROB indicates to the MOB that the linear address for the youngest (i.e. most recent), valid, retiring memory uop or the oldest (i.e. latest), valid, excepted, retiring memory uop needs to be written to memory for potential use by an invoked exception handler. To do this, the ROB transmits the retirement valid bit RVB, the exception code and the FLA tag bit for each of the retiring ROB Pdst entries to a Save Floating point Linear Address (SVFLA) bit generation unit. The output from the SVFLA generation unit will be a logical high state for the youngest, valid, retiring memory uop when the RVB is set, the FLA tag bit is set and the exception code indicates that no unmasked exception has occurred with the corresponding uop. If these conditions are true for more than one of the retiring ROB Pdst entries, the SVFLA unit selects the youngest Pdst entry of a sequential grouping of valid Pdst entries (beginning from Pdst 0) in which each Pdst entry has a set RVB. With reference to Table I shown above, if the pattern of RVB's were as shown in column 1 (C1), Pdst 2 would be selected, whereas in columns 2 (C2) and 3 (C3), Pdst 1 and Pdst 0, respectively, would be selected.

On the other hand, if one or more exceptions did occur for the three retiring uops, then the oldest, valid, excepted retiring uop is then selected regardless of whether it is the youngest, valid, retiring uop or not. In this case, the SVFLA generation unit selects the lowest numbered, excepted Pdst entry for which its RVB and FLA tag bit are both set. For example, in the case shown in FIG. 3, the ROB entry of Pdst 0 would selected since its RVB and FLA tag bit are set and it is the oldest, excepted memory uop. According to the preferred embodiment, the linear address for only one valid, retiring memory uop will be written to memory per clock cycle, although this need not be the case if the hardware of the present invention were duplicated. For this reason, the pattern of SVFLA bits for the three retiring uops will form an exclusive pattern that uniquely identifies only one uop. The SVFLA bits are then transmitted to each Pdst entry of the MOB where the three results of the last qualification (for each MOB Pdst entry) are finally qualified with the respective SVFLA bits so as to output from this third qualification a single, high logic state for only one Pdst entry of the MOB for which all the previously stated conditions are true.

Since at most only one of the ROB Pdst entries indicated by the retirement pointers RP's will have its linear address read out per clock cycle, the logic states output from the last qualification are combined in an OR gate implemented for each Pdst entry of the LB and SB, which OR gate has its output (i.e. a read signal when the output is a logical high state) coupled to a bit line of the respective Pdst entry for reading out the linear address, the ADJ bit and one of a SBV or LBV for the selected entry. Therefore, if a uop selected for retirement 1) is a FP memory uop (such that it has a corresponding Pdst entry in either the LB or SB and has its FLA tag bit set), 2) has its data and linear address available, and 3) is either the youngest, valid, retiring memory uop or the oldest, valid, excepted memory uop, then the output from the OR gate forms a high logic state which signals a standard array read of the matching Pdst entry in either the LB or SB.

Accordingly, when a Pdst entry in either the LB or SB satisfies each of the above conditions, its linear address (including the AdJ bit) is read out onto a dedicated read bus for the respective buffer by means of its corresponding bit line being discharged upon the final qualification in stage 93. At the same time, for subsequent use in writing the linear address into the FLA control register. Note, however, that since the ROB lacks knowledge as to the type of operations being retired, the linear address ADJ bit and the SBV or LBV for the Pdst entry identified as being the youngest, valid, retiring memory uop or the oldest, valid, excepted memory uop may reside in either the LB or SB. Therefore, when a Pdst entry in either the LB or SB meets each of the conditions listed above, the read signal output from the OR gate for that entry forms a logical high state that is used to enable discharging of the respective bit lines so as to read the above-noted information of the identified Pdst entry out to only one dedicated bus, while the other dedicated bus remains idle since the read signals for the Pdst entries of that corresponding buffer all form logical low states.

Figure 4:
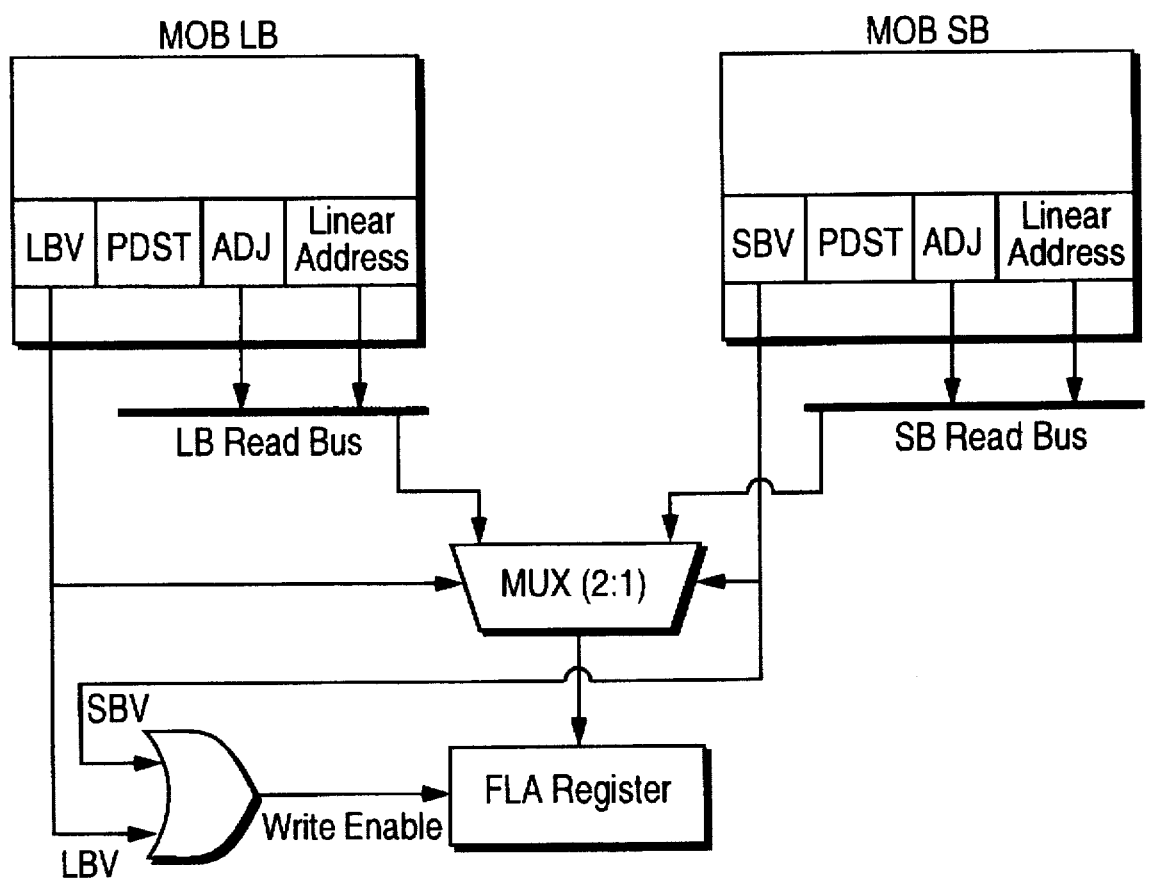
FIG. 4 is a block diagram of one embodiment of the mechanism used to write the floating point linear address to a control register.

Once the linear address of the identified uop has been read out from either the LB or SB onto a respective dedicated read bus, a mechanism must be provided for selecting the appropriate bus from which to write the linear address into the FLA register within the processor's control space. As shown in the embodiment of FIG. 4, this is accomplished by coupling each of the LB and SB read busses as input to a 2:1 multiplexor which is enabled by the latched valid bits (LBV and SBV) of their respective buffers. The LBV and SBV are also input to an OR gate which acts as a write enable for writing the selected output from the multiplexor to the FLA register. Therefore, upon the occurrence of an exception or an SMI, micro-code can access the linear address of either the youngest, valid, retiring memory uop or the oldest, valid, excepted memory uop from the FLA register and reconstruct its effective address using its corresponding FP data segment stored in the RRF. According to the present invention, reconstruction of the uop's effective address can either be done in micro-code or in hardware.

Although the above-described mechanisms enable the linear address of most FP uops to be stored in memory, one class of FP uops presents a special problem that must be handled separately. Because an at-retirement store deallocates its entry in the MOB before the store is retired from the ROB, the transmission of the SVFLA bits in the ROB retirement process is effectively too late to read the linear address of that uop's corresponding entry the MOB. This can be shown in the pipeline stages for retirement of an at-retirement store, as shown in FIG. 6, wherein the MOB performs a store address re-dispatch in stage 41, then a linear address translation in stage 42 and a data cache write back in stage 43. However, the store buffer entry for the at-retirement store is also deallocated in stage 43 by setting its valid bit to zero which occurs four cycles before the SVFLA bits are computed for the corresponding entry in the MOB.

One possible solution to this problem is not to deallocate the at-retirement store in stage 43, but to wait for it to turn senior and deallocate it as an already dispatched senior store. However, this increases the latency of store operations in addition to the number of SB entries that are required, thereby decreasing performance and increasing the die area needed for the extra entries. Another solution is to latch the linear address of an at-retirement store upon its redispatch in stage 41, and to keep latching the linear address along the retirement pipe stages 91–93 until the ROB transmits the SVFLA bits to the MOB.

Figure 5:
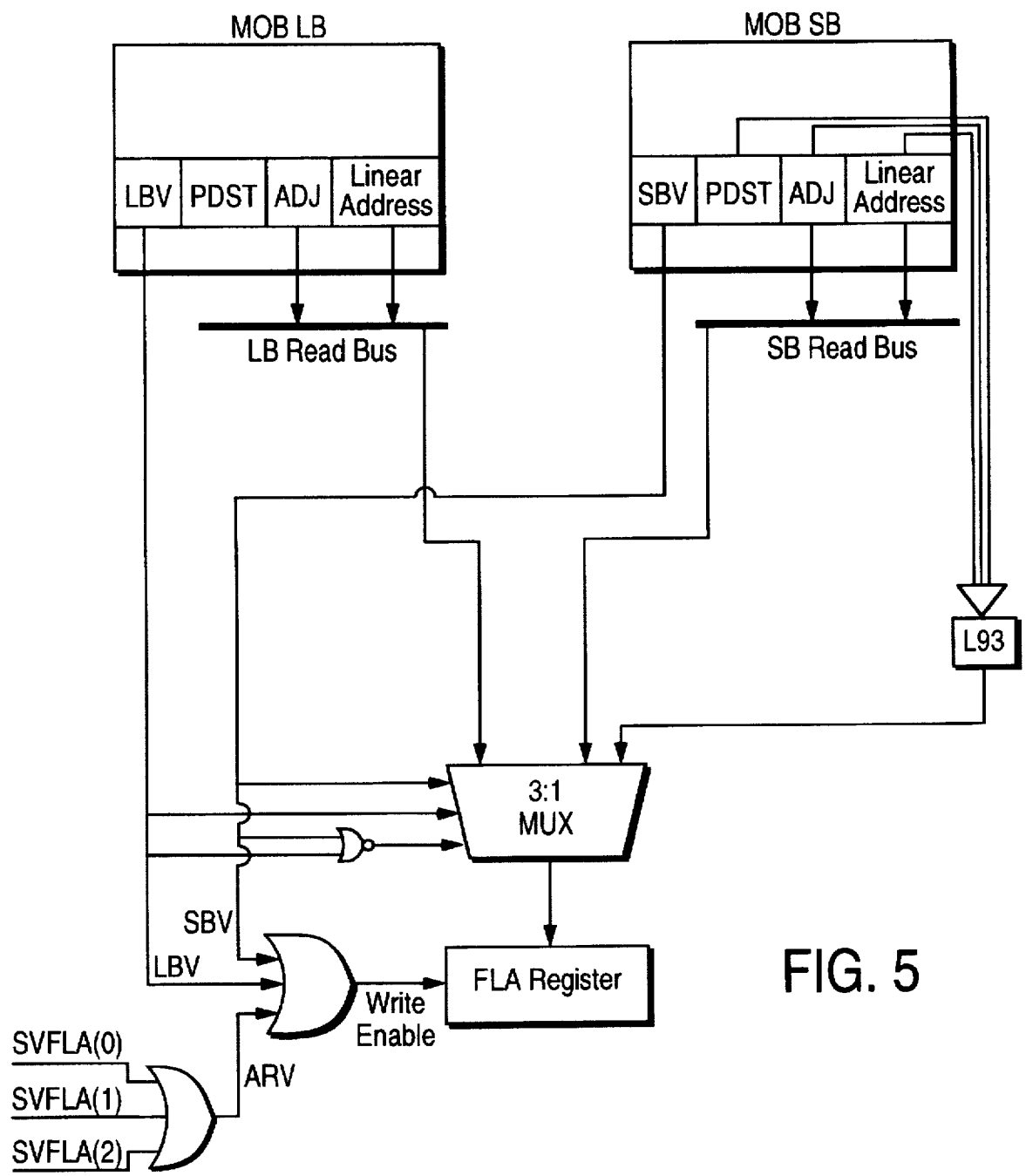
FIG. 5 is a block diagram of another embodiment of the mechanism used to write the floating point linear address to a control register.

As shown in FIGS. 3 and 5, this is accomplished through implementation of a series of four latches which sequentially latch not only the linear address (and AdJ bit) but also the Pdst index for the uop which is required for subsequent translation of its linear address. In order to select the appropriate source from which the linear address will be written into the FLA control register, the output of the fourth latch (i.e., L93) is input to a 3:1 multiplexor which also receives as input the contents of each the LB and SB read bus. To select the appropriate input to be passed through the multiplexor, both the LBV and SBV are coupled directly to the multiplexor enable as previously described. However, to select the latched at-retirement store linear address, the SBV and LBV are input to a NOR gate having its output coupled to the multiplexor enable such that the at-retirement linear address will be selected when the excepted uop does not have a valid Pdst entry in either the LB or SB.

So as to enable a register write with the selected input to the multiplexor, the three SVFLA bits transmitted from the ROB in pipe stage 93 are input to a first OR gate to produce an at-retirement store valid bit (ARV) that is subsequently input to second OR gate which also receives as input the SBV and LBV. Hence, a write enable is asserted to the FLA control register when either the LBV, SBV or the ARV is set high, indicating that a memory uop is to be retired but that it is neither a load or a senior store uop.

While the invention has been described in conjunction with the preferred embodiment, it is evident that numerous alternatives, depictions, variations and uses will be apparent to those skilled in the art in light of the foregoing description. Thus, it is understood that the invention is not to be limited by the foregoing illustrative details, but rather, is to be defined by the appended claims.

We claim:

1. A method for recovering the effective address of a memory instruction in a microprocessor, the microprocessor comprising at least one execution unit for executing a plurality of instructions, the plurality of instructions comprising at least memory instructions, the method comprising the steps of:

generating a linear address for a given memory instruction in an address generation unit;

writing the linear address of the given memory instruction to a first storage device;

deriving a data segment for the given memory instruction from micro-code;

writing the data segment to a second storage device;

executing the given memory instruction in the execution unit to produce corresponding memory execution data;

reading both the linear address and the data segment of the given memory instruction out the first and second storage devices, respectively; and reconstructing the effective address of the given memory instruction by subtracting the segment base address from the linear address.

2. The method according to claim 1, wherein the microprocessor executes the plurality of instructions out-of-order and comprises a re-order buffer (ROB) having storage locations for buffering execution data produced in response to the execution of the plurality of instructions, the microprocessor further comprising a memory order buffer (MOB) having storage locations for buffering memory execution data of executed memory instructions waiting for access to memory, and wherein the step of writing the linear address of the given memory instruction to a first storage device is performed by writing the linear address of the given memory instruction to the MOB and wherein the step of writing the data segment to a second storage device is performed by writing the data segment of the given memory instruction to the ROB.

3. The method according to claim 1, wherein the step of reconstructing the effective address of the given memory instruction is performed by one of hardware circuitry and micro-code.

4. The method according to claim 1, wherein the steps of generating a linear address for the given memory instruction in an address generation unit and writing the linear address of the given memory instruction to a first storage device further comprise the steps of:

generating a linear address adjust (ADJ) bit for the given memory instruction in the address generation unit, the ADJ bit indicating when set that the given memory instruction comprises the second portion of a double access memory operation; and writing the ADJ bit of the given memory instruction to the first storage device.

5. The method according to claim 4, wherein the step of reconstructing the effective address of the given memory instruction further comprises the step of subtracting a predetermined offset from the linear address of the memory instruction before subtracting the segment base address from the linear address when the ADJ bit is set to obtain an adjusted linear address forming a linear address of the first portion of the double access memory operation, the segment base address being subtracted from the adjusted linear address to obtain an effective address of the second portion of the double access memory operation.

6. A method for recovering the effective address of a floating point (FP) memory instruction in an out-of-order microprocessor for use by an exception handler upon the occurrence of one of an exception and a systems management interrupt, the microprocessor comprising at least one execution unit for executing a plurality of instructions out-of-order and a re-order buffer (ROB) having storage locations for buffering execution data comprising at least completion data produced in response to execution of the plurality of instructions, the plurality of instructions comprising at least memory instructions having memory execution data comprising at least memory completion data produced in response to execution of the memory instructions in the execution unit, the microprocessor further comprising a memory order buffer (MOB) having storage locations for buffering the memory execution data of corresponding memory instructions waiting for access to memory, the ROB supplying execution data of corresponding instructions to micro-code and the MOB writing memory execution data of corresponding memory instructions to memory in retirement of respective instructions, the method comprising the step of:

generating a linear address for the FP memory instruction in an address generation unit;

writing the linear address of the FP memory instruction to the MOB;

deriving a FP data segment for the FP memory instruction from micro-code;

writing the FP data segment of the FP memory instruction to the ROB;

executing the FP memory instruction in the execution unit to produce corresponding memory execution data for the FP memory instruction;

reading the linear address of the FP memory instruction out of the MOB upon retirement of the FP memory instruction; and reconstructing the effective address of the FP memory instruction and writing the reconstructed effective address to the exception handler upon one of the occurrence of an exception in execution of the FP memory instruction and the occurrence of a systems management interrupt after execution of the FP memory instruction but before retirement of the FP memory instruction, the effective address being reconstructed by the steps of reading the FP data segment of the FP memory instruction out of the ROB, and subtracting the segment base address from the linear address.

7. The method according to claim 6, wherein each instruction is associated with a location designator that identifies a unique storage location within the ROB for storage of at least the location designator and the execution data of the corresponding instruction, the location designator of each memory instruction further identifying a unique storage location within the MOB for storage of at least the location designator and the memory execution data of the corresponding memory instruction, and wherein the step of writing the linear address of the FP memory instruction to the MOB is performed by the step of writing the linear address to an address field of the storage location of the MOB identified by the location designator of the FP memory instruction.

8. The method according to claim 7, wherein the step of reading the linear address of the FP memory instruction out of the MOB upon retirement of the FP memory instruction is performed by the steps of:

associatively matching the location designators of N preselected instructions of the ROB with the location designator of each memory instruction buffered in the MOB, the N preselected instructions of the ROB comprising the N oldest instructions currently buffered in the ROB; and writing the linear address stored in the address field of the MOB of a matched memory instruction resulting from the associative matching of location designators to a third storage device when A) the linear address of the matched memory instruction stored in the address field of the MOB is valid, and B) result data produced from the execution of the corresponding memory instruction has been written into a corresponding storage location of the ROB.

9. The method according to claim 8, wherein the step of writing the linear address stored in the address field of the MOB of a matched memory instruction resulting from the associative matching of location designators to a third storage device is further conditioned by the requirement that the matched memory instruction is one of the youngest instruction of the N preselected instructions and the oldest instruction of the N preselected instructions having caused an exception during execution.

10. The method according to claim 9, wherein when two memory instructions qualify for writing the corresponding linear addresses to the third storage device the linear address of the oldest instruction of the N preselected instructions having caused an exception during execution will be written to the third storage device.

11. The method according to claim 7, wherein the step of reading the linear address of the FP memory instruction out of the MOB upon retirement of the FP memory instruction is performed by the steps of:

associatively matching the location designators of N preselected instructions of the ROB with the location designator of each memory instruction buffered in the MOB to produce a first set of N match bits for each memory instruction of the MOB, with each of the N match bits of a memory instruction of the MOB corresponding to a preselected instruction of the ROB and being set upon a match between location designators, the N preselected instructions of the ROB comprising the N oldest instructions currently buffered in the ROB;

generating from the completion data of the N preselected instructions buffered in the ROB a retirement valid bit (RVB) for each of the N preselected instructions indicating when set that the corresponding instruction has been executed by the execution unit and result data produced from the execution of the corresponding instruction has been written into the corresponding storage location of the ROB;

generating from the completion data of the memory instructions buffered in the MOB a MOB valid bit (MVB) bit for each of the memory instructions of the MOB indicating when set that the linear address of the corresponding memory instruction stored in the address field of the MOB is valid;

generating from the completion data of the N preselected instructions buffered in the ROB a save floating point linear address (SVFLA) bit for each of the N preselected instructions indicating when set that the corresponding instruction has a set RVB and is one of the youngest instruction of the N preselected instructions and the oldest instruction of the N preselected instructions having caused an exception during execution; and writing the linear address of a memory instruction stored in the address field of the MOB to the third storage device when A) the match bit of the corresponding memory instruction is set, B) the MVB of the corresponding memory instruction is set, and C) the SVFLA bit of the corresponding memory instruction is set.

12. The method according to claim 11, wherein when two memory instructions qualify for writing the corresponding linear addresses to the third storage device the linear address of the oldest instruction of the N preselected instructions having caused an exception during execution will be written to the third storage device.

13. The method according to claim 6, wherein the step of reconstructing the effective address of the FP memory instruction is performed by one of hardware circuitry and micro-code.

14. The method according to claim 6, wherein the steps of generating the linear address for the FP memory instruction in the address generation unit and writing the linear address of the FP memory instruction to the MOB further comprise the steps of:

generating a linear address adjust (ADJ) bit for the FP memory instruction in the address generation unit, the ADJ bit indicating when set that the FP memory instruction comprises the second portion of a double access memory operation; and writing the ADJ bit of the FP memory instruction to the first storage device.

15. The method according to claim 14, wherein the step of reconstructing the effective address of the FP memory instruction further comprises the step of subtracting a predetermined offset from the linear address of the FP memory instruction before subtracting the segment base address from the linear address when the ADJ bit is set to obtain an adjusted linear address forming a linear address of the first portion of the double access memory operation, the segment base address being subtracted from the adjusted linear address to obtain an effective address of the second portion of the double access memory operation.

16. A computer system comprising:

an input/output (I/O) means for providing a communications interface;

a memory means coupled to said I/O means for providing data input and data output to interface with a computer user; and microprocessor means coupled to the I/O means for executing instructions and processing computer data, the microprocessor means comprising (a) at least one execution unit for executing a plurality of instructions out-of-order, the plurality of instructions comprising at least memory instructions, (b) a re-order buffer (ROB) having storage locations for buffering execution data produced in response to execution of the plurality of instructions, each instruction being associated with a location designator to identify a unique storage location within the ROB in which the execution data for a corresponding executed instruction is written, (c) a memory order buffer (MOB) having storage locations for buffering memory execution data of executed memory instructions waiting for access to memory, each memory instruction buffered in the MOB corresponding to a memory instruction buffered in the ROB and having a unique storage location within the MOB containing at least the location designator of the memory instruction and a linear address computed by an address generation unit, and (d) means for reconstructing the effective address of memory instructions from the corresponding linear address of the memory instructions stored within the MOB for use by an exception handler upon the occurrence of one of an exception and a systems management interrupt.

17. The apparatus according to claim 16, wherein the means for reconstructing the effective address of the memory instructions comprises means for writing the linear address of at least one memory instruction stored in the corresponding storage location of the MOB to a storage device when the location designator of the memory instruction buffered within the MOB matches the location designator of one of N preselected instructions in the ROB comprising the N oldest instructions currently buffered in the ROB, the matching memory instruction in the MOB being denoted as a matched instruction, valid execution data for the matched instruction has been computed and written back into the corresponding storage location of the ROB by the execution unit, the matched instruction has a computed and valid linear address stored in the corresponding storage location of the MOB, and the matched instruction comprises one of the youngest instruction of the N preselected instructions and the oldest instruction of the N preselected instructions having caused an exception during execution.

18. The apparatus according to claim 17, wherein the means for writing the linear address of at least one memory instruction stored in the corresponding storage location of the MOB to a storage device comprises:

means for associatively matching the location designators of the N preselected instructions of the ROB with the location designator of each memory instruction buffered in the MOB to produce a first set of N match bits for each memory instruction of the MOB, with each of the N match bits of a memory instruction of the MOB corresponding to a preselected instruction of the ROB and being set upon a match between location designators;

means for generating from the execution data of the N preselected instructions buffered in the ROB a retirement valid bit (RVB) for each of the N preselected instructions indicating when set that the corresponding instruction has been executed by the execution unit and valid result data produced from the execution of the corresponding instruction has been written into the corresponding storage location of the ROB;

means for generating from the execution data of the memory instructions buffered in the MOB a MOB valid bit (MVB) for each of the memory instructions of the MOB indicating when set that the linear address of the corresponding memory instruction stored in the MOB is valid;

means for generating from the execution data of the N preselected instructions buffered in the ROB a save floating point linear address (SVFLA) bit for each of the N preselected instructions indicating when set that the corresponding instruction has a set RVB and is one of the youngest instruction of the N preselected instructions and the oldest instruction of the N preselected instructions having caused an exception during execution, the SVFLA bit being set only for the oldest instruction of the N preselected instructions when one memory instruction has a set RVB and is the youngest instruction of the N preselected instructions and another memory instruction has a set RVB and is the oldest instruction of the N preselected instructions having caused an exception during execution; and bus means for enabling the writing of the linear address of a memory instruction stored in the MOB to a third storage device when
A) the match bit of the corresponding memory instruction is set,
B) the MVB of the corresponding memory instruction is set, and
C) the SVFLA bit of the corresponding memory instruction is set.

19. A method for recovering the effective address of memory instructions in an out-of-order microprocessor for use by an exception handler upon the occurrence of one of an exception and a systems management interrupt, the microprocessor comprising a re-order buffer (ROB) having storage locations for buffering any execution data produced in execution of the plurality of instructions and memory, the plurality of instructions comprising at least memory instructions having corresponding linear addresses calculated by an address generation unit, the microprocessor further comprising a memory order buffer (MOB) having storage locations for buffering any memory execution data of corresponding memory instructions, the method comprising the step of:

assigning to each memory instruction a unique location designator specifying a storage location in each of the ROB and MOB;

writing the linear addresses of the memory instructions to the storage locations of the MOB identified by the location designators of the memory instructions;

selecting a memory instruction for retirement when the location designator of the memory instruction assigned to the ROB indicate the memory instruction is the oldest instruction currently in the ROB;

reading the linear address of the memory instruction out of the MOB, calculating a physical address for the memory instruction using the corresponding linear address;

determining whether the physical address is valid;

committing the selected memory instruction to system state in a first retirement process when the physical address is valid, the first retirement process comprising the steps of:

accessing memory at the memory location specified by the physical addresses;

deallocating the location designator of the memory instruction assigned to the ROB, deallocating the location designator of the memory instruction assigned to the MOB, and supplying an effective address of the memory instruction to the exception handler upon detecting one of the occurrence of an exception and the occurrence of a systems management interrupt in processing of the memory instruction, the effective address being generated by deriving a data segment for the memory instruction from micro-code and reconstructing the effective address of the memory instruction the segment base address from the linear address of the memory instruction; and committing the selected memory instruction to system state in a second retirement process when the physical address is invalid, the second retirement process comprising the steps of:

recalculating the physical address of the memory instruction, accessing memory at the memory location specified by the physical addresses while deallocating the location designator of the memory instruction assigned to the MOB, deallocating the location designator of the memory instruction assigned to the ROB once the memory access is complete, and supplying an effective address of the memory instruction to the exception handler upon detecting one of the occurrence of an exception and the occurrence of a systems management interrupt in processing of the memory instruction, the effective address being generated by deriving a data segment for the memory instruction from micro-code and reconstructing the effective address of the memory instruction by subtracting the segment base address from the linear address of the memory instruction.

* * * * *